Figure 1:
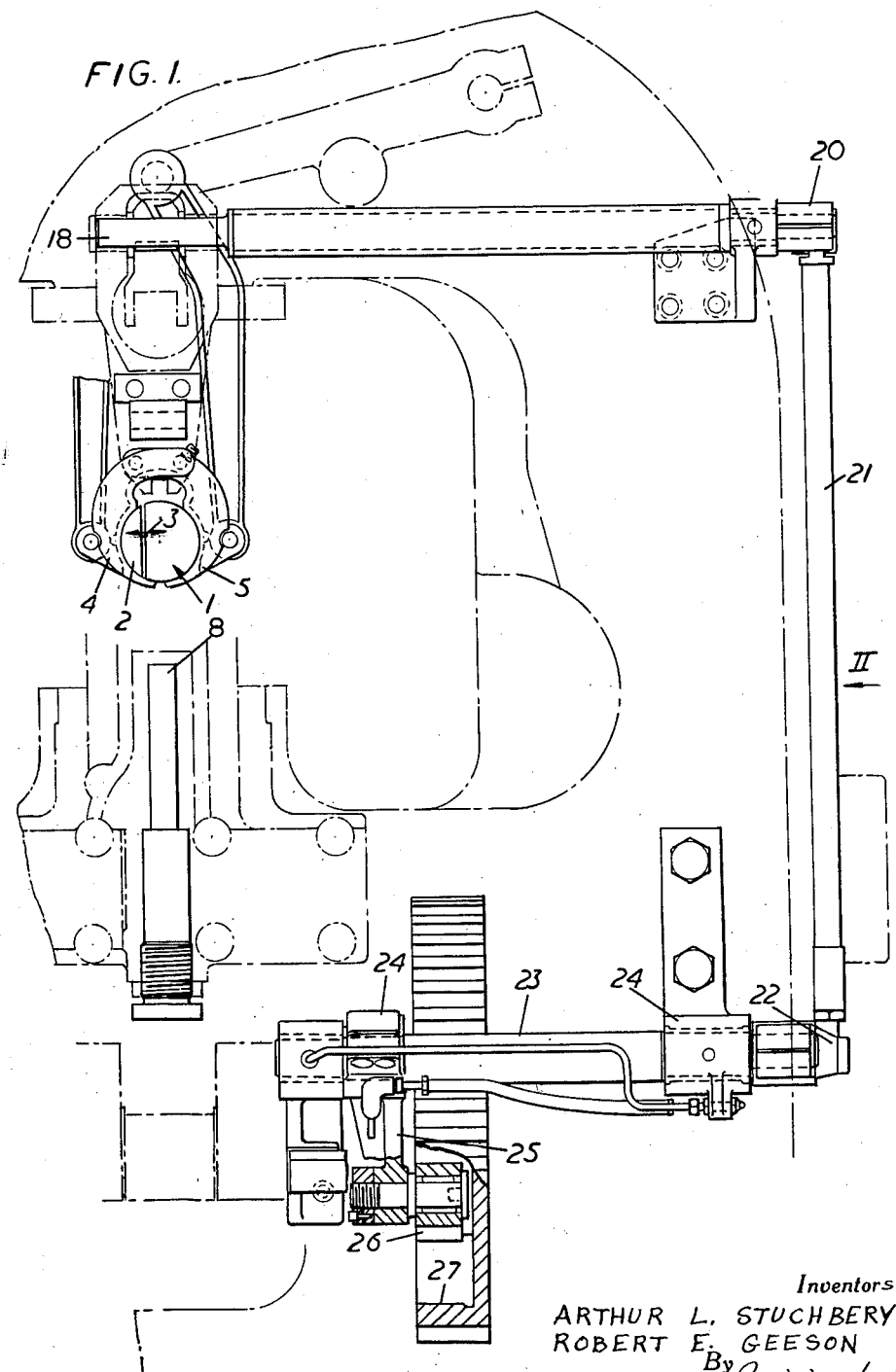

Inventors
ARTHUR L. STUCHBERY
ROBERT E. GEESON

Dec. 26, 1961   A. L. STUCHBERY ETAL   3,014,445
APPARATUS FOR FORMING CAN BODIES
Filed Dec. 29, 1959   4 Sheets-Sheet 3

Inventors
ARTHUR L. STUCHBERY
ROBERT E. GEESON
By *Imirie & Smiley*
Attorneys

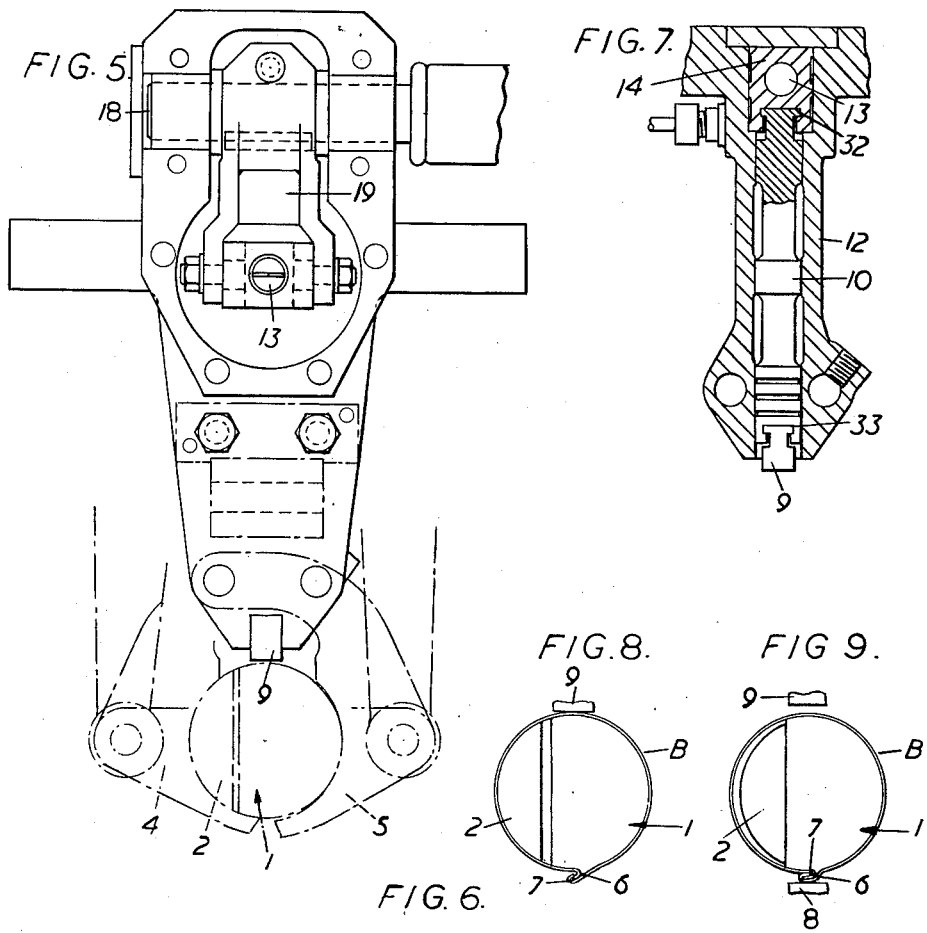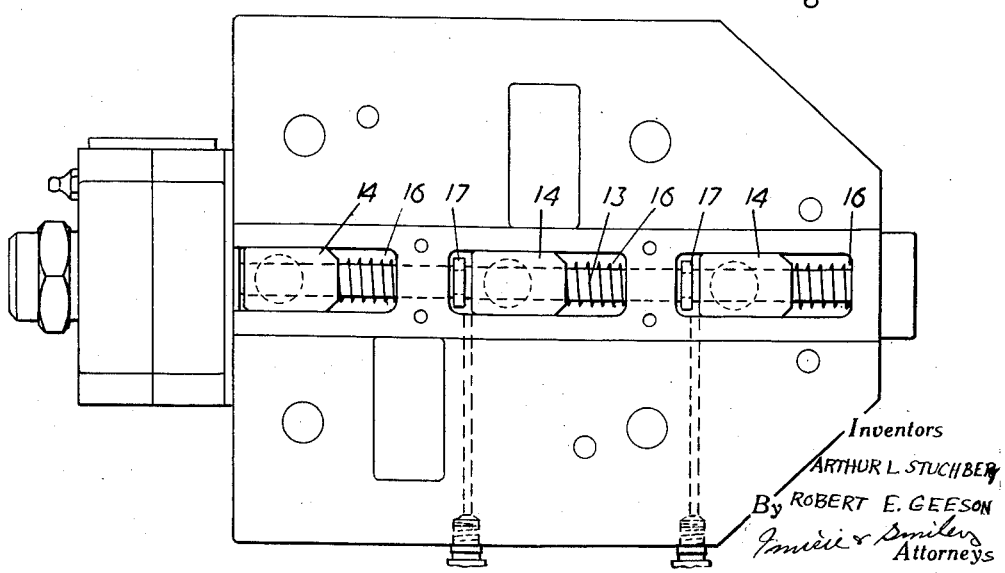

United States Patent Office 3,014,445
Patented Dec. 26, 1961

3,014,445
APPARATUS FOR FORMING CAN BODIES
Arthur Leslie Stuchbery, Enfield, and Robert Ernest Geeson, Croydon, England, assignors to The Metal Box Company Limited, London, England, a company of Great Britain
Filed Dec. 29, 1959, Ser. No. 862,580
Claims priority, application Great Britain Jan. 21, 1959
8 Claims. (Cl. 113—12)

This invention relates to apparatus for forming from thin sheet metal a can body which has a side-seam formed from flattened hooks.

Apparatus at present used to form can-bodies having side-seams formed from flattened hooks usually includes shaping devices which are operable to form a body blank about a mandrel which is arranged to be contracted to effect interlocking of the seam-forming hooks of the blank and expanded as the hooks are flattened by a hammer against the mandrel. In these known forms of apparatus the mandrel may be spring-loaded for movement towards a fixed clamp between which and the mandrel a blank is gripped during forming of the blank about the mandrel and flattening of the seam-forming hooks. With such apparatus, however, it is necessary positively to move the mandrel away from the fixed clamp in order to permit the bodies to be removed from the mandrel and such movement can only be effected after the hammer has effected flattening of the hooks and has been fully disengaged therefrom. It is found that with this form of apparatus there is a tendency, when the mandrel has been contracted and the hammer is disengaged from the seam, for the body to reshape due to stresses within the body and that, because the body is clamped between the mandrel and the fixed clamp while there is no control over the flattened seam, the hook elements forming the seam tend slightly to pull apart to leave a gap therebetween which must, during the soldering of the seam, be filled with solder. This results in what is known in the art as the production of "thick laps" and such laps, as is well understood, have a weakening effect upon the subsequent end-seaming when can ends are applied to the body.

It is a main object of the present invention to provide a means of controlling a body blank while it is being delivered to the forming position thereof, while it is being formed, and also to control the flattened seam formation during reshaping of the body due to stresses therein following contraction of the mandrel about which the body is formed, thereby to reduce or eliminate the production of bodies having "thick laps."

According to the invention, apparatus for forming from thin sheet metal a can body which has a side-seam formed from flattened hooks includes shaping devices operable to form a body blank about a mandrel arranged to be expanded to effect interlocking of the seam-forming hooks of the blank and contracted immediately the hooks are flattened by a hammer against the mandrel and is characterised by clamping means extending lengthwise of and movable relative to the mandrel in a manner such that the blank is lightly pressed against the mandrel while being moved to the position at which it is formed about the mandrel, is clamped firmly against the mandrel during forming of the blank and until the interlocked hooks are flattened by the hammer, and is released by the clamping means while the flattened hooks are gripped between the mandrel and hammer thereby to permit internal stresses to reshape the body while the hook formation is controlled by the hammer.

Figure 2:
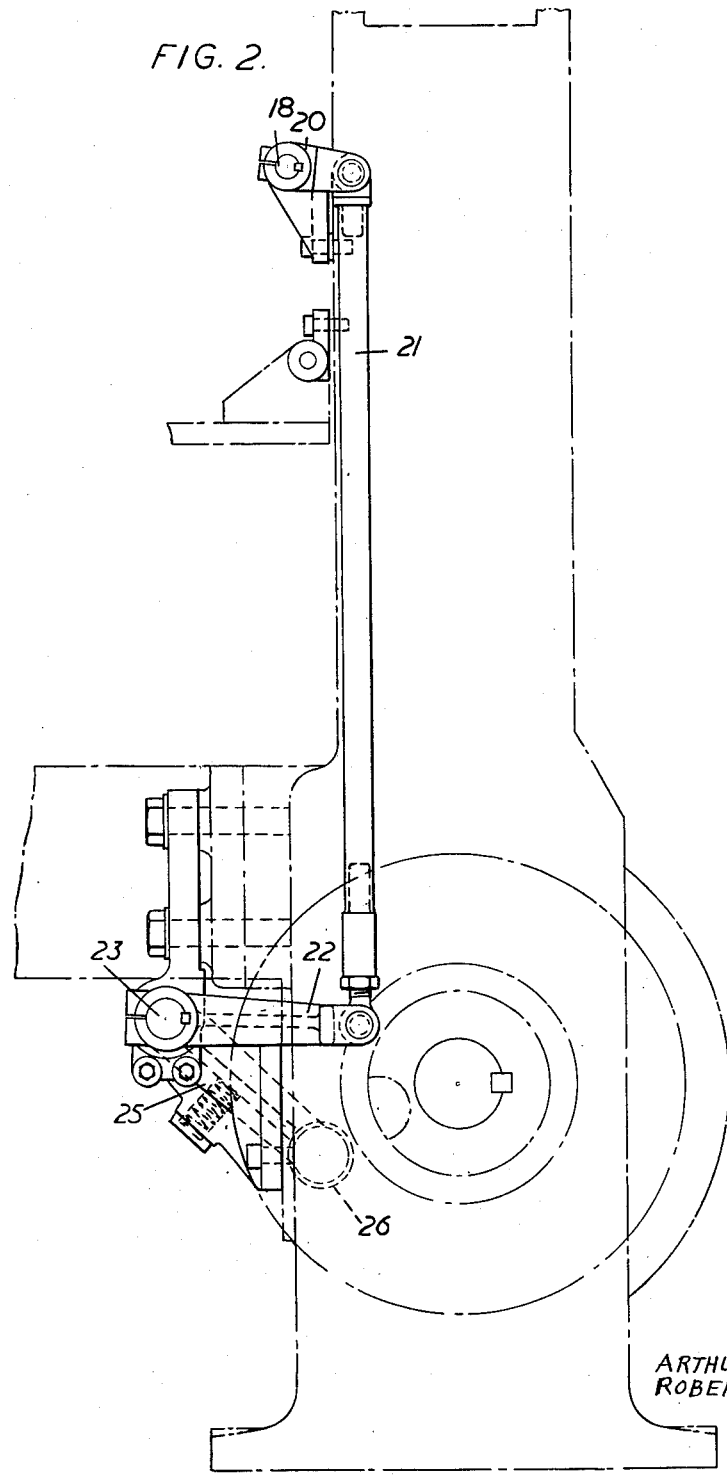
Figure 3:
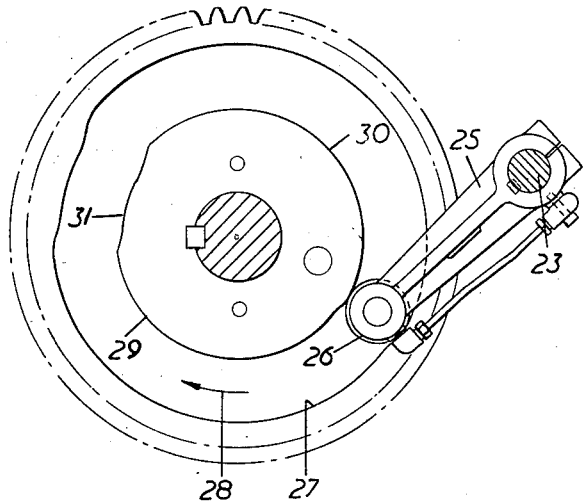
Figure 4:
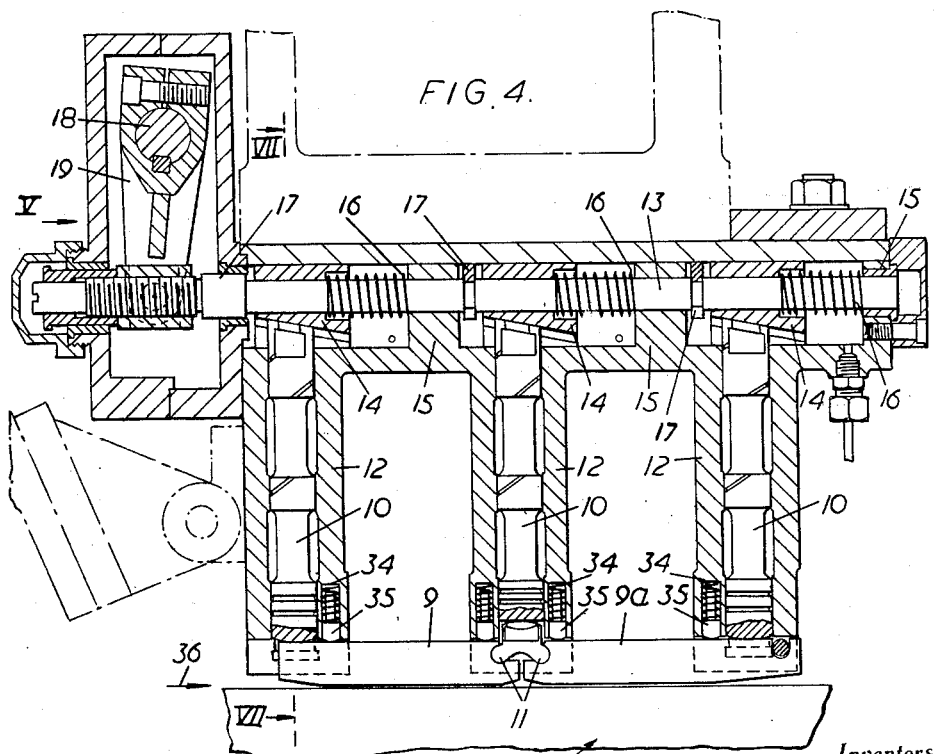

In order that the invention may be clearly understood, one embodiment thereof will now be described, by way of example, with reference to the accompanying drawings, in which:

FIGURE 1 is an elevation of apparatus for actuating clamping means according to the invention, FIGURE 2 is a view looking in the direction of arrow II, FIGURE 1, FIGURE 3 illustrates a cam embodied in the apparatus, FIGURE 4 is a section through the clamping apparatus, FIGURE 5 is a view looking in the direction of arrow V, FIGURE 4, some parts being omitted for clarity, FIGURE 6 is a top plan of FIGURE 4 with some parts omitted for clarity, FIGURE 7 is a section on line VII—VII, FIGURE 4, FIGURE 8 illustrates diagrammatically the formation of a body about the mandrel prior to the hammering of the seam, and FIGURE 9 illustrates diagrammatically the relative positions of the mandrel, the clamping means, and the hammer during reshaping of the body before removal thereof from the mandrel.

Referring to the drawings, the construction of the mandrel is well known as are the means for effecting expansion and contraction thereof, and such means are not illustrated in the drawings, or described herein. Similarly, the shaping devices which are arranged to form a body blank about the mandrel are of well known construction, and the means for effecting operation of the shaping devices and of the hammer for flattening the seam-forming hooks, being of well known construction, will not be described herein.

Referring to FIGURE 1, the mandrel is illustrated diagrammatically by the reference numeral 1, the expanding cheek thereof being indicated by the reference numeral 2. In the apparatus with which the present invention is concerned, the portion 1 of the mandrel is secured in a fixed position and only the portion 2 thereof is movable to permit expansion and contraction of the mandrel as indicated by the double-headed arrow 3. The shaping devices comprise the usual shaping members 4, 5, the extremities of which, as is customary, are arranged to locate one within the other the can body seam-forming hooks 6, 7, FIGURES 8 and 9. The hammer 8 is operated in known manner, by mechanism not shown but actuated by a shaft with which a cam 27, described below, is rotatable, to be reciprocable towards and away from the mandrel to effect flattening of the inter-engaged hooks 6, 7.

It will be understood that, before forming thereof, the body blank is substantially flat, except for the seam-forming hooks formed along opposite edges of the blank, and the blank is moved by feeding means, not shown, between the mandrel 1 and clamping means which extend lengthwise of the mandrel to be movable relative to the mandrel in a manner such that the blank is lightly pressed against the mandrel while it is being moved to the position at which it is formed about the mandrel by the shaping elements 4, 5. When the blank is in position for forming, the clamping means is arranged to clamp the blank firmly against the mandrel, the firm clamping of the blank being maintained throughout the forming of the blank about the mandrel and until the interengaged hooks 6, 7 are flattened by the hammer 8. At the moment immediately after the hammer 8 completes its movement towards the mandrel, the clamping pressure is released from the body so that the internal stresses in the body reshape the body while the hook formation of the side-seam is still controlled by the hammer 8 due to the pressure exerted between the hammer and the mandrel, thus constraining the flattened hooks against springing apart while the internal stresses in the body effect reshaping thereof.

The clamping means includes a clamping element which, in FIGURE 4, is shown as being divided between opposite ends thereof to form two portions 9, 9a. The clamping element 9, 9a is in the form of a bar which extends lengthwise of the mandrel 1 and the opposite ends of the element 9, 9a are connected to supporting members 10, the intermediate end portions of the element 9, 9a also being supported by a supporting member 10 and connected by swivel joints 11 which are carried by this member 10. The supporting members 10 are guided in housings 12 for lengthwise movement in directions substantially at right angles to the longitudinal axis of the mandrel 1 and actuator means, to be described below, are operable to effect simultaneous lengthwise movement of the supporting members to cause the above described relative movement between the clamping element and the mandrel.

The actuator means comprises an axially movable actuator rod 13 which supports an actuator member, illustrated as a wedge 14, for each of the supporting members. The actuator rod 13 is supported for axial movement by bearings 15 integral with the housings 12 and the actuator wedges 14 are movable axially on the rod 13, being urged by springs 16 to the positions thereof at which the clamping element 9, 9a is arranged to firmly clamp a body B formed about the mandrel as illustrated diagrammatically in FIGURE 8. Abutments 17 movable with the actuator rod 13 are arranged to engage the actuator wedges 14 to effect axial movement of the wedges against the action of their springs 16 thereby to cause the wedges 14 to effect movement of the supporting members 10 and the clamping element 9, 9a away from the mandrel to apply the above-mentioned light pressure or to disengage the clamping element from the formed body.

Axial movement of the actuator rod 13 is effected by driving means which includes a rock shaft 18, and a driving arm 19 which connects the actuator rod 13 to the rock shaft. Also connected to the rock shaft 18 is an arm 20, FIGURES 1 and 2, which through a connecting rod 21 is connected to an arm 22 secured to a stub shaft 23 rockable in bearings 24, FIGURE 1, by an arm 25 which carries a cam follower roller 26 engaged in a box cam 27. The configuration of the cam 27 is illustrated in FIGURE 3 and, on rotation of the cam in the direction of the arrow 28, FIGURE 3, the clamping element 9, 9a is arranged to effect the above-mentioned light pressure on a blank being fed to the forming position thereof while the follower 26 is engaged with the portion 29 of the cam, is arranged to apply the heavy clamping pressure while the follower 26 engages the portion 30 of the cam, and is moved to a position at which it is free from the body while the follower 26 is engaged with the portion 31 of the cam.

As can be seen from FIGURE 7, the supporting arms 10 are provided with tongues 32 which are engaged in slots formed in the actuator wedges 14 so that the wedges can slide relatively to the supporting members while effecting lengthwise movement thereof in either direction but with a limited amount of free travel, and the clamping element 9, 9a is provided with tongues 33 which engage in slots formed in the lower end of the supporting member 10, and the clamping element pressed in a downward direction by springs 34 and studs 35 which, in conjunction with the free travel of the wedges 14, provide the light pressure required while the blank is being moved over the mandrel to the forming position.

When the apparatus is in operation, as a blank is moved in the direction of arrow 36, FIGURE 4, to the forming position thereof, the cam follower 26 is engaged with the portion 29 of cam 27 so that the actuator rod 13 is moved to the right, as viewed in FIGURE 4, to a position at which the abutments 17 move the wedges 14 simultaneously to the right against the action of springs 16 thereby releasing the pressure on the supports 10 due to the free travel permitted to the wedges so that the springs 34 and studs 35 act on the clamping element to apply a light pressure to the blank as it is moved over the mandrel 1 to the forming position. When the blank reaches the forming position the portion 30 of the cam 27 causes movement of actuator rod 13 to the left, as viewed in FIGURE 4, thus allowing springs 16 to move the supporting members 10 further towards the mandrel to an extent such that the clamping elements 9, 9a securely clamp the blank against the mandrel 1. The articulation of the clamping element 9 by the swivel joints 11 permits the clamping element 9 to accommodate slight variations in thickness of the body blank so as to ensure that a substantially uniform clamping pressure is applied to the body blank. If desired, however, the clamping element 9 may be formed as a unitary member having only its opposite ends connected to supporting members 10. Alternatively, if desired, a further articulation may be provided along the length of the clamping element by providing a further supporting member 10 and swivel joint 11. It will also be understood that if desired the apparatus may be employed to form two or more blanks simultaneously about the mandrel in which event each of the portions 9, 9a of the clamping element will be of a length such as to effect clamping of one body blank against the mandrel 1.

As the hammer 8 reaches the top of its stroke, following forming of the blank and interengagement of its hooks, 6, 7 by the shaping members 4, 5, the cam portion 31 causes the actuator rod 13 to be moved fully to the right, as viewed in FIGURE 4, so that the abutments 17 restore the actuator wedges 14 quickly to the positions thereof at which they exert no downward lengthwise pressure on the supporting members 10, the members being moved upwards by the wedges 14 so that the clamping element 9, 9a is disengaged from the shaped body. Pressure exerted on the flattened side-seam by the hammer is at this time still maintained and before it is fully relieved by movement of the hammer away from the mandrel, the internal stresses in the body cause the body to be reshaped due to the fact that the mandrel is contracted, as illustrated in FIGURE 9, this contraction being effected at about the time when the hammer reaches the end of its stroke towards the mandrel. Because the seam formation is at this time controlled by the pressure exerted thereon between the hammer 8 and the mandrel 1, the internal body stresses cause the reshaping to be effected with little or no relative displacement of the flattened hooks 6, 7, thus lessening considerably the possibility of gaps being formed in the side-seam to result in a "thick-lap" after soldering of the side-seam.

In a modified embodiment of the invention, only two of the wedges 14, FIG. 4, are movable axially on rod 13 as described above, the third wedge, usually that shown at the right of FIG. 4, is fixed to the rod 13. By this means the fixed wedge is positively operated by rod 13 while the wedges which are slidable axially of the rod are controlled by their springs 16 to compensate for varying thickness of a blank.

We claim:

1. Apparatus for forming from thin sheet metal a can body which has a side-seam formed from flattened hooks, comprising the combination with shaping devices operable to form a body blank about a mandrel arranged to be expanded to effect interlocking of the seam-forming hooks of the blank and contracted immediately the hooks are flattened by a reciprocable hammer against the expanded mandrel, of a clamping element extending lengthwise of the mandrel, supporting members connected to the clamping element and guided for movement in directions substantially at right angles to the longitudinal axis of the mandrel, resilient means co-operating with the clamping element to cause the element lightly to press a blank against the mandrel, an actuator movable with and relative to each said support and spring-urged to a position thereof at which the support is moved thereby towards the mandrel thereby to cause said element firmly to clamp the blank against the mandrel during forming of the blank by said shaping devices and hammering of the hooks by said hammer, and operating means co-operating with said actuators and including a cam operable in timed relation with the operation of said shaping devices and hammer and contoured to control movement of the actuators according to a sequence in which the actuators first permit control of the clamping element by said resilient means while the blank is being positioned relative to the mandrel for shaping, are next placed under control of the springs appropriate thereto to effect said firm clamping of the blank, and are moved with said supports to disengage the clamping element from the formed blank while the hooks are engaged between the hammer and mandrel thereby to permit internal stresses in the body to effect reshaping of the body while the hook formation is clamped between the hammer and mandrel.

2. Apparatus according to claim 1, including a rod supported for axial movement by said cam and by which said actuators are supported for movement therewith and axially relative thereto under control of the springs co-operating with the actuators.

3. Apparatus according to claim 2, including for each actuator an abutment movable with said rod to effect movement of the actuator against the action of the spring co-operating therewith.

4. Apparatus according to claim 3, wherein the operating means includes a rock shaft, a driving arm connecting the rod with the rock shaft, and connecting elements connecting the rock shaft with said cam.

5. Apparatus for forming from thin sheet metal a can body which has a side-seam formed from flattened hooks, comprising the combination with shaping devices operable to form a body blank about a mandrel arranged to be expanded to effect interlocking of the seam-forming hooks of the blank and contracted immediately the hooks are flattened by a reciprocable hammer against the expanded mandrel, a pair of clamping elements disposed in end-to-end relation and extending lengthwise of the mandrel, swivel joints connecting the adjacent ends of said elements, supporting members connected to the clamping elements and guided for movement in directions substantially at right-angles to the longitudinal axis of the mandrel, resilient means co-operating with the clamping elements to cause the elements lightly to press a blank against the mandrel, an actuator movable with and relative to each said support and spring-urged to a position thereof at which the support is moved thereby towards the mandrel thereby to cause said elements firmly to clamp the blank against the mandrel during forming of the blank by said shaping devices and hammering of the hooks by said hammer, and operating means co-operating with said actuators and including a cam operable in timed relation with the operation of said shaping devices and hammer and contoured to control movement of the actuators according to a sequence in which the actuators first permit control of the clamping elements by said resilient means while the blank is being positioned relative to the mandrel for shaping, are next placed under control of the springs appropriate thereto to effect said firm clamping of the blank, and are moved with said supports to disengage the clamping elements from the formed blank while the hooks are engaged between the hammer and mandrel thereby to permit internal stresses in the body to effect reshaping of the body while the hook formation is clamped between the hammer and mandrel.

6. Apparatus according to claim 5, including a rod supported for axial movement by said cam and by which said actuators are supported for movement therewith and axially relative thereto under control of the springs co-operating with the actuators.

7. Apparatus according to claim 6, including for each actuator an abutment movable with said rod to effect movement of the actuator against the action of the spring co-operating therewith.

8. Apparatus according to claim 7, wherein the operating means includes a rock shaft, a driving arm connecting the rod with the rock shaft, and connecting elements connecting the rock shaft with said cam.

References Cited in the file of this patent
UNITED STATES PATENTS

| | | |
|---|---|---|
| 1,149,987 | Ross | Aug. 10, 1915 |
| 1,625,091 | Peters | Apr. 19, 1927 |
| 1,661,569 | Lange | Mar. 6, 1928 |
| 1,750,550 | Troyer et al. | Mar. 11, 1930 |
| 2,010,155 | Hull et al. | Aug. 6, 1935 |
| 2,652,801 | Laxo | Sept. 22, 1953 |
| 2,741,204 | Winters | Apr. 10, 1956 |